US012585596B2

(12) United States Patent
Zhang et al.

(10) Patent No.: US 12,585,596 B2
(45) Date of Patent: Mar. 24, 2026

(54) DATA PADDING DEVICE AND DATA PADDING METHOD

(71) Applicant: SigmaStar Technology Ltd., Fujian (CN)

(72) Inventors: Bing Zhang, Shanghai (CN); Rui He Wang, Shanghai (CN); Yu Jie Qiu, Shanghai (CN); Wei Zhu, Shanghai (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 0 days.

(21) Appl. No.: 18/895,502

(22) Filed: Sep. 25, 2024

(65) Prior Publication Data

US 2025/0190365 A1     Jun. 12, 2025

(30) Foreign Application Priority Data

Dec. 6, 2023     (CN) .......................... 202311675513.8

(51) Int. Cl.
| | |
|---|---|
| *G06F 12/08* | (2016.01) |
| *G06F 12/122* | (2016.01) |
| *G06F 13/28* | (2006.01) |

(52) U.S. Cl.
CPC ............ *G06F 12/122* (2013.01); *G06F 13/28* (2013.01)

(58) Field of Classification Search
CPC .......... G06F 12/122; G06F 13/28; G06F 1/00; G06F 3/00; G06F 5/00; G06F 7/00; G06F 15/00; G06F 18/00
See application file for complete search history.

(56) References Cited

U.S. PATENT DOCUMENTS

| | | | | |
|---|---|---|---|---|
| 11,500,802 B1 * | 11/2022 | Xu | ..................... | G06F 15/17318 |
| 2011/0202695 A1 * | 8/2011 | Nandan | ................ | H04N 19/563 |
| | | | | 711/E12.019 |

* cited by examiner

*Primary Examiner* — Yong J Choe

(74) *Attorney, Agent, or Firm* — Edell, Shapiro & Finnan, LLC

(57) ABSTRACT

A data padding device includes an internal memory, a direct memory access (DMA) circuit and a data processing circuit. The DMA circuit performs, according to a first padding control signal, data padding in a first direction on raw data during a process of reading the raw data from an external memory to generate first-direction padding data, and stores the first-direction padding data to the internal memory, wherein the first-direction padding data includes the raw data and first padding data originated from the raw data. The data processing circuit performs, according to a second padding control signal, data padding in a second direction on the first-direction padding data during a process of reading the first-direction padding data from the internal memory to generate second-direction padding data, wherein the second-direction padding data includes the first-direction padding data and second padding data originated from the first-direction padding data.

8 Claims, 7 Drawing Sheets

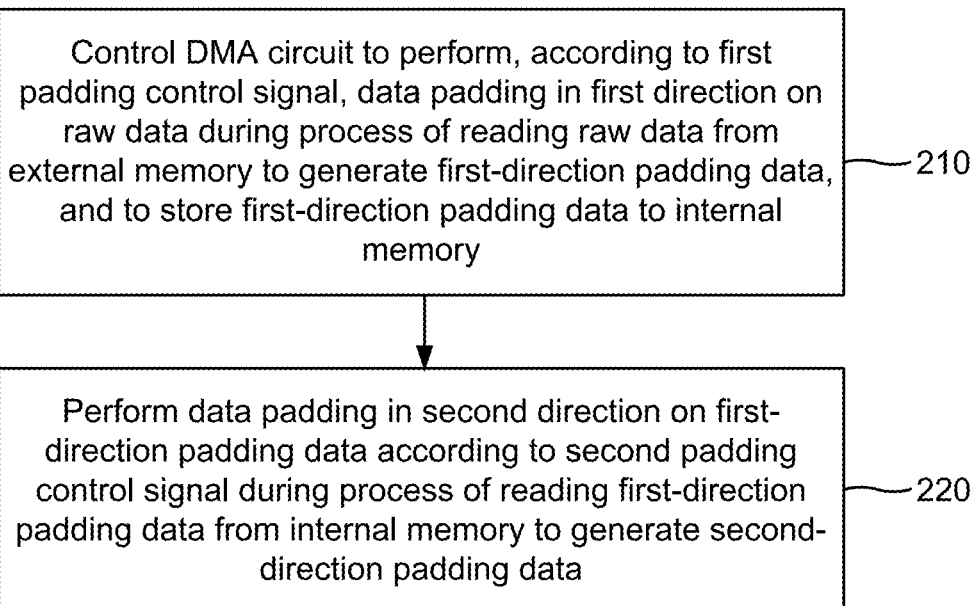

200

Control DMA circuit to perform, according to first padding control signal, data padding in first direction on raw data during process of reading raw data from external memory to generate first-direction padding data, and to store first-direction padding data to internal memory ⟞210

Perform data padding in second direction on first-direction padding data according to second padding control signal during process of reading first-direction padding data from internal memory to generate second-direction padding data ⟞220

FIG. 2

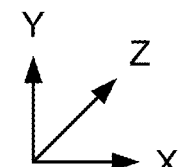
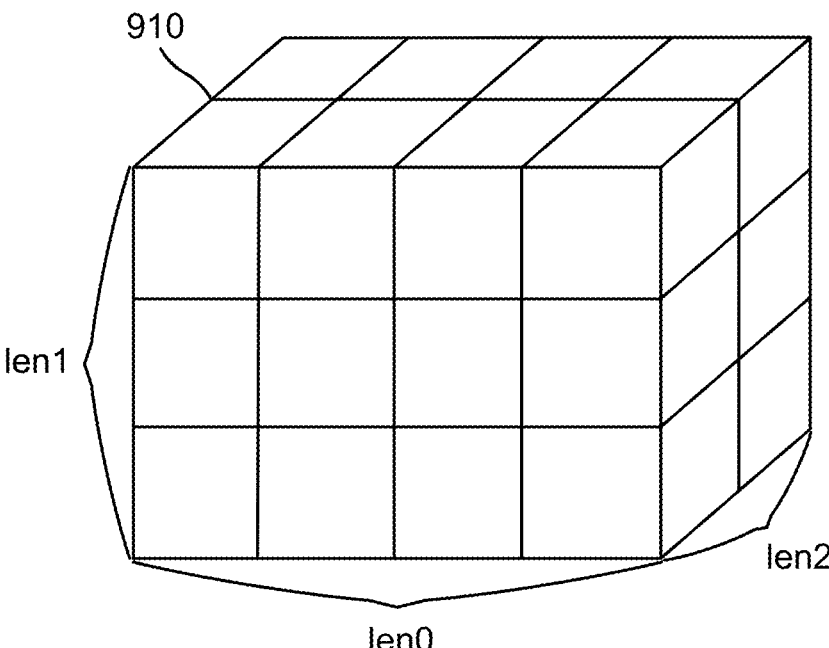
FIG. 3

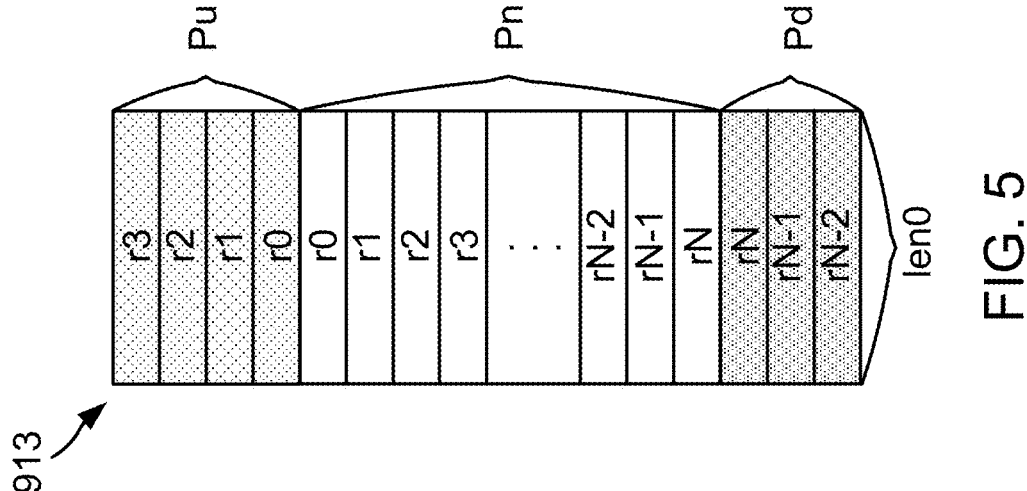
FIG. 5
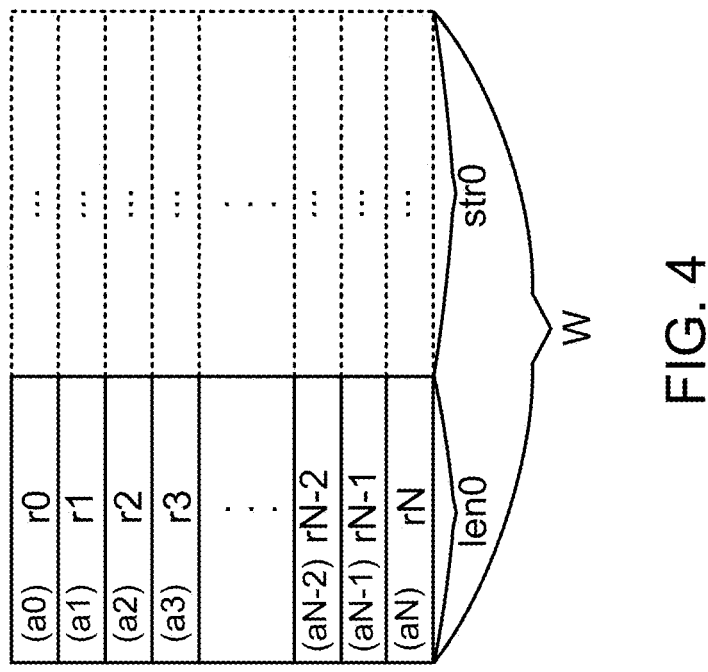
FIG. 4

100                    900

DATA PADDING DEVICE AND DATA PADDING METHOD

This application claims the benefit of China application Serial No. CN202311675513.8, filed on Dec. 16, 2023, the subject matter of which is incorporated herein by reference.

BACKGROUND OF THE INVENTION

Field of the Invention

The present application relates to a data padding device and a data padding method, and more particularly to a data padding device and a data padding method operable to perform data padding in multiple directions.

Description of the Related Art

In convolution calculations of a neural network, the data padding technique is used to assist the calculations. A data padding operation needs to first read data and then pads the data. The series of operations of first reading data and then padding the data limit the speed of processing the data. More specifically, both reading data and padding data respectively need a reading time and a padding time, such that the speed of processing the data is limited.

From another perspective, if the operation of data padding is to be performed, data padding can be performed only after the data is read, hence resulting in a limited speed of processing the data. As such, the use of image data cannot be maximized, further leading to a waste in hardware resources.

SUMMARY OF THE INVENTION

In view of the drawbacks of the prior art, it is an object (for example but not limited to) of the present application to provide a data padding device and a data padding method to improve the drawbacks of the prior art.

In some embodiments, a data padding device includes an internal memory, a direct memory access (DMA) circuit and a data processing circuit. The DMA circuit performs, according to a first padding control signal, data padding in a first direction on raw data during a process of reading the raw data from an external memory to generate first-direction padding data, and stores the first-direction padding data to the internal memory, wherein the first-direction padding data includes the raw data and first padding data originated from the raw data. The data processing circuit performs, according to a second padding control signal, data padding in a second direction on the first-direction padding data during a process of reading the first-direction padding data from the internal memory to generate second-direction padding data, wherein the second-direction padding data includes the first-direction padding data and the second padding data originated from the first-direction padding data.

In some embodiments, the data padding method is adapted for a data padding device including an internal memory, a direct access memory (DMA) circuit and a data processing circuit. The data padding method is implemented by a processing that executes a plurality of instructions, and includes: controlling the DMA circuit to perform, according to a first padding control signal, data padding in a first direction on raw data during a process of reading the raw data from an external memory to generate first-direction padding data, and to store the first-direction padding data to the internal memory, wherein the first-direction padding data includes the raw data and first padding data originated from the raw data; and controlling the DMA circuit to perform, according to a second padding control signal, data padding in a second direction on the first-direction padding data during a process of reading the first-direction padding data from the internal memory to generate second-direction padding data, wherein the second-direction padding data includes the first-direction padding data and second padding data originated from the first-direction padding data.

The data padding device and the data padding method of the present application are capable of performing data padding in multiple directions according to a padding control signal, and performing data padding while reading the data. Thus, the present application can enhance data processing speed, maximize the use of image data and prevent any waste in hardware resources.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

FIG. 2 is a flowchart of a data padding method according to some embodiments of the present application.

FIG. 3 is a schematic diagram of a data structure according to some embodiments of the present application.

FIG. 4 is a schematic diagram of raw data according to some embodiments of the present application;

FIG. 5 is a schematic diagram of first-direction padding data according to some embodiments of the present application;

DETAILED DESCRIPTION OF THE INVENTION

Figure 1:
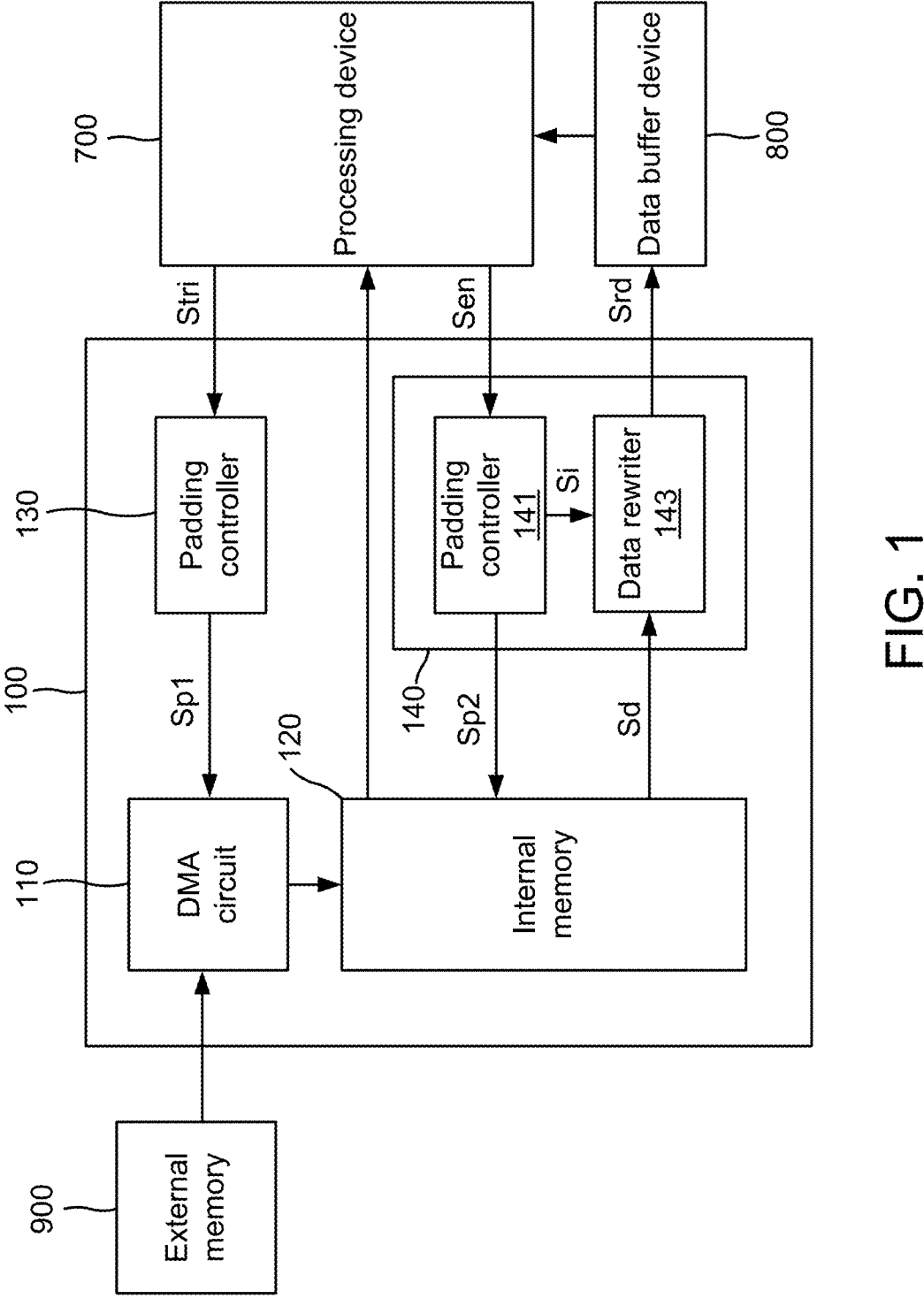
FIG. 1 is a schematic diagram of a data padding device, a processing device, a data buffer device and an external memory according to some embodiments of the present application.

FIG. 1 shows a schematic diagram of a data padding device 100, a processing device 700, a data buffer device 800 and an external memory 900 according to some embodiments of the present application. As shown in the drawing, the data padding device 100 includes a direct memory access (DMA) circuit 110, an internal memory 120, a padding controller 130 and a data processing circuit 140.

Operations of the data padding device 100 are described in detailed in combination with FIG. 2 below. FIG. 2 shows a flowchart of a data padding method 200 according to some embodiments of the present application.

When the data padding method 200 is performed, the processing device 700 issues a first enable signal Stri to read data, to the padding controller 130. The padding controller 130 generates a first padding control signal Sp1 according to the first enable signal Stri, and transmits the first padding control signal Sp1 to the DMA circuit 110. In some embodiments, the processing device 700 may be a graphics processing unit (GPU) or an intelligence processing unit (IPU). The DMA circuit 110 may be a DMA device.

In step S210, according to the first padding control signal Sp1, data padding in a first direction on raw data is performed during a process of reading the raw data from the external memory 900 to generate first-direction padding data, and the first-direction padding data is stored to the internal memory 120. In some embodiments, the external memory 900 may be a dynamic random access memory (DRAM), or any memory device to/from which data can be accessed.

Details of data padding are described in combination with FIG. 3 below. FIG. 3 shows a schematic diagram of a data structure 910 according to some embodiments of the present application. The data structure 910 includes a basic unit count len0 of data, a total number of rows lens1 of data, and a total depth len2 of data. The data padding device 100 of the present application is capable of performing data padding in multiple directions (for example, X, Y and Z directions) on the data structure 910 by using the data padding method 200, with associated details to be given in the description below.

Referring to FIG. 1, the DMA circuit 110 reads raw data from the external memory 900 according to the first padding control signal Sp1. For example, referring to FIG. 4, the padding control signal Sp1 at least includes an initial address (for example, a0), a data length (for example, len0), a row count (for example len1) and a stride length (for example, str0). Assuming that two rows of data (for example, row data r0 and r1) is to be read from raw data 911, the DMA circuit 110 reads the raw data 911 from the starting address a0, continues reading for the data length len0, skips the stride length str0 to a target address a1, and continues reading for the data length len0 from the target address a1, so as to obtain two rows of the raw data 911.

As an extension to read N rows of data, assuming that the raw data 911 includes N+1 rows of data r0 to rN, the DMA circuit 110 reads the raw data 911 from the starting address a0, continues reading for the data length len0, skips the stride length str0 to the target address a1, and continues reading for the data length len0 from the target address a1; the steps above are repeated. Lastly, the DMA circuit 110 again reads the raw data 911 from a target address aN and continues reading for the data length len0, hence obtaining N rows of the raw data 911.

In some embodiments, the actual number of the N rows of the raw data 911 read above is determined by the row count len1 in the first padding control signal Sp1. Assuming that the row count lens1 in the padding control signal Sp1 is three, the actual number of the N rows of the raw data 911 read is then three. With the above operations of the present application, two dimensional data len0*len1 in any desired size can be read. Moreover, according to a similar approach, in the present application, after the two-dimensional len0*len1 is completely read, a new stride (for example, str1) and a new row count len2 are added so as to read data in a direction of a depth len2 of the data structure 910. After the data in the direction of the depth len2 is completely read, the present application can obtain a complete set of three-dimensional data len0*len1*len2. Taking FIG. 3 for example, the present application can obtain the three-dimensional data structure 910 in dimensions 4*3*2.

In some embodiments, referring to FIG. 4, a data width W of data stored in the external memory 900 may be data of 128 storage units, each of which includes multi-bit data (for example, 8-bit data). The data length len0 of the raw data 911 needing to be read in the present application may be 4 storage units, and the data width W and the data length len0 differ by one stride str0, which may be the data width W subtracted by the data length len0. Thus, after the raw data 911 of four storage units is completely read in the present application, the stride str0 needs to be skipped to continue reading the raw data 911 of the next row.

Referring to FIG. 4, during the process of reading the raw data 911 by the DMA circuit 110 according to the first padding control signal Sp1, data padding in the first direction is performed on the raw data 911 to generate first-direction padding data 913 in FIG. 5.

For example, referring to FIG. 4, the DMA circuit 110 performs data padding in the first direction on the raw data 911. Assume that data up-padding by four rows of data is to be performed on the raw data 911, and a mirror data padding approach is adopted. At this point, according to a starting address a3, the data length len0, the row count len1 (which is 4) and the stride str0 included in the first padding control signal Sp1, the DMA circuit reads the raw data 911 from the starting address a3, continues reading in a first reading direction (for example, a direction from left to right) for the data length len0 according to a burst continuous reading mode (with a burst length of len0), skips a total of one data width W and the data length len0 including the data length len0, the stride str0 and the data length len0 in a second reading direction (for example, a direction from right to left) opposite to the first reading direction to a target address a2, continues reading from the target address a2 in the first reading direction for the first length len0, and repeats the steps above, and lastly, the DMA circuit 110 again reads the raw data 911 from the target address a0, continues reading for the data length len0, and obtains four rows of up-padding data. It is understandable that, the number of rows of up-padding data is determined according to the row count len1 in the first padding control signal Sp1, depending on actual requirements.

Referring to FIG. 5, the obtained up-padding data Pu is padded above the raw data (denoted as Pn), and has a data sequence of row data r3, row data r2, row data r1 and row data r0 that are in mirror symmetry with the raw data (denoted as Pn).

Then, referring to FIG. 4, assume that the raw data 911 includes n rows of data r0 to rN. At this point, according to the starting address a0, the data length len0, the row count len1 (which is N+1) and the stride str0 included in the first padding control signal, the DMA 110 reads the raw data 911 from the starting address a0, continues reading in the first reading direction (for example, a direction from left to right) for the data length len0, skips the stride str0 in the first reading direction to the target address a1, continues reading from the target address a1 in the first reading direction for the data length len0, and repeats the steps above. Lastly, the DMA 110 then reads the raw data 911 from the target address aN, continues reading for at least one data length len0, and thus obtaining the N rows of raw data 911. Referring to FIG. 5, the obtained raw data 911 is denoted by Pn.

Then, referring to FIG. 4, assume that data down-padding by three rows of data is to be performed on the raw data 911, and a mirror data padding approach is to be adopted. At this point, according to the starting address aN, the data length len0, the row count len1 (which is 3) and the stride str0 included in the first padding control signal Sp1, the DMA 110 starts reading the raw data 911 from the starting address aN, continues reading in the first reading direction (for example, a direction from left to right) for the data length len0, skips a total of one data width W and the data length len0 including the data length len0, the stride str0 and the data length len0 in a second reading direction (for example, a direction from right to left) opposite to the first reading direction to a target address aN−1, continues reading from the target address aN−1 for at least one first length len0 in the first reading direction, and repeats the steps above. Lastly, the DMA circuit 110 again reads the raw data 911 from the target address aN−1, continues reading for at least one data length len0, and thus obtains three rows of down-padding data. It is understandable that, the number of rows of down-padding data is determined according to the row count len1 in the first padding control signal Sp1, depending on actual requirements.

Referring to FIG. 5, the obtained down-padding data Pd is padded below the raw data (denoted as Pn), and has a data sequence of row data rR, row data rN−1 and row data rN−2 that are in mirror symmetry with the raw data (denoted as Pn). In some embodiments, the DMA circuit 110 obtains the first-direction padding data 913 after performing the data up-padding and the data down-padding, and stores the first-direction padding data 913 to the internal memory 120. As described above, since the DMA circuit 110 performs both the data up-padding and the data down-padding while the raw data is read, the present application achieves data reading and data padding in parallel, hence increasing a data processing speed as well as reducing complexities of hardware circuits of a data padding device.

In some embodiments, to implement the operation of data up-padding, the operation of obtaining the raw data 911 and the operation of data down-padding, the padding controller 130 may send the first padding control signal Sp1 three times to the DMA circuit 110, and these operations may be performed sequentially by the DMA circuit 110 according to the three first padding control signals Sp1. Moreover, to perform data up-padding or data down-padding in the present application, such may be performed directly according to a given starting address (for example, the starting address a3). Alternatively, a calculation may be performed according to an original address of the raw data 911 and the number of rows needed for padding, and the starting address a3 is calculated according to the original address a0 and the data width W. It should be noted that, when only one row of data is taken for padding in an up-padding operation or a down-padding operation, the corresponding first padding control signal Sp1 may include only the starting address a0 and the data length len0.

It is quite clear that padding data read by both the operation of data up-padding and the operation of data down-padding is originated from the raw data.

In step S220, according to a second padding control signal Sp2, data padding in a second direction is performed on the first-direction padding data during a process of reading the first-direction padding data from the internal memory 120 to generate second-direction padding data.

Figure 6:
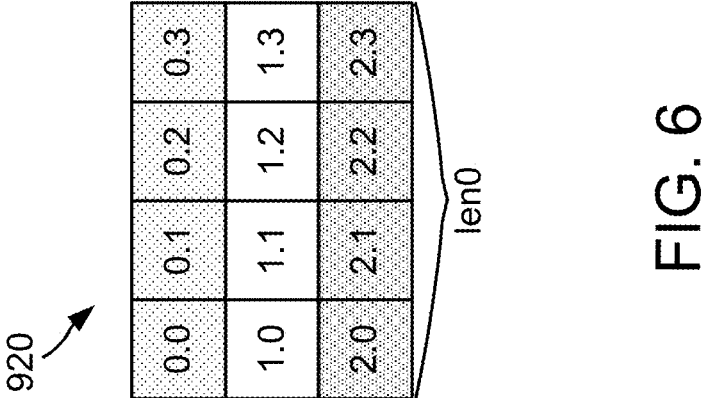
FIG. 6 is a schematic diagram of a data structure according to some embodiments of the present application.

Details of data padding in the second direction are described in combination with FIG. 6 below. FIG. 6 shows a schematic diagram of a data structure 920 according to some embodiments of the present application. The basic unit count of row data of the data structure 920 is len0, and the data structure 920 herein includes three rows of data. With the data padding device 100 and the data padding method 200 of the present application, data padding in the second direction (for example, the horizontal direction) can be performed on the data structure 920 to generate second-direction padding data 921 shown in FIG. 7, with associated details to be given in the description below.

Figure 8:
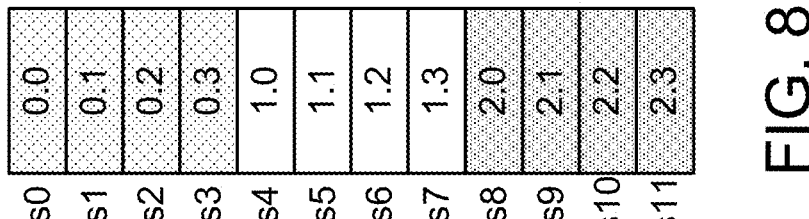
FIG. 8 is a schematic diagram of data storage locations of an internal memory according to some embodiments of the present application.

For example, referring to FIG. 1, after the processing device 700 learns that the first-direction padding data is stored to the internal memory 120 (for example, upon receiving a notification returned to the internal memory 120), the data processing circuit 140 is controlled to read the first-direction padding data from the internal memory 120 according to the second padding control signal Sp2. Referring to FIG. 8, assume that the internal memory 120 includes 12 data addresses s0 to s11 in which data in FIG. 6 is stored, wherein the data can be first-direction padding data. The data processing circuit 140 may read the first-direction padding data from the internal memory 120 according to the second padding control signal Sp2. In some embodiments, the internal memory 120 may be a static random access memory (SRAM), or any memory device to/from which data can be accessed.

Details of data padding are described below. Referring to FIG. 8, while the data processing circuit 140 reads the first-direction padding data from the internal memory 120, the data processing circuit 140 at the same time performs data padding. To achieve this object, the data processing circuit 140 adaptively and repeatedly reads some of the data, for example, reads data at the data addresses s0, s0, s1, s2, s3 and s3, that is, the data processing circuit 140 repeatedly reads the data at the data address s0 and the data address s3 as padding data, further performing data padding in the horizontal direction on the first-direction padding data 920, thereby generating the second-direction padding data 921 shown in FIG. 7. Since the data processing circuit 140 also performs data padding while reading the data, the present application can enhance data processing speed, maximize the use of image data and prevent any waste in hardware resources.

Referring to FIG. 1, the data processing circuit 140 includes a padding controller 141 and a data rewriter 143. The processing device 700 issues a second enable signal Sen to read data, to the padding controller 141, and the padding controller 141 generates the second padding control signal Sp2 according to the second enable signal Sen.

In some embodiments, the second padding control signal Sp2 includes a plurality of data addresses and an auto-increment (for example, 4). Referring to FIG. 8, the second padding controller 141 reads the first-direction padding data from the internal memory 120 according to the data addresses (for example, the data addresses s0, s0, s1, s2, s3 and s3) to obtain the second-direction padding data. In some embodiments, the auto-increment is used to release data addresses having been read from the internal memory 120 after these data addresses of the internal memory 120 are completely read. For example, assume that the auto-increment is 4. Once the data addresses (for example, s0, s0, s1, s2, s3 and s3) of the internal memory 120 are completely read, the second padding controller 141 directly skips to the data address s4 from the data address s0 according to the auto-increment so as to continue the data reading. Meanwhile, spaces of the data addresses s0 to s3 are released and may be again written by new data.

Figure 7:
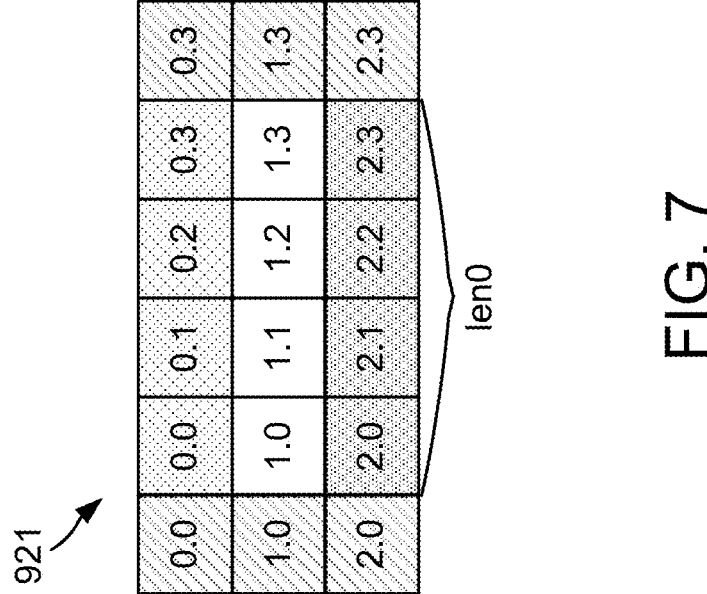
FIG. 7 is a schematic diagram of second-direction padding data according to some embodiments of the present application.

In some embodiments, the data addresses in the second padding control signal Sp2 includes at least one repeated data address, and the second padding controller 141 reads the first padding data and the second-direction padding data from the internal memory 120 according to the repeated address. For example, according to the repeated data addresses s0 and s3, the second padding controller 141 repeatedly reads the first-direction padding data at the data address s0 of the internal memory 120 to obtain first padding data 0.0 and repeatedly reads the first-direction padding data at the data address s3 of the internal memory 120 to obtain second padding data 0.3. Referring to FIG. 7, the second-direction padding data 921 includes the first padding data 0.0, the first-direction padding data 0.0, 0.1, 0.2 and 0.3, and the second padding data 0.3. In other words, the second-direction padding data 921 after the padding is completed includes the data 0.0, 0.0, 0.1, 0.2, 0.3 and 0.3.

By repeating the steps above, the second padding controller 14 may obtain second-row data 1.0, 1.0, 1.1, 1.2, 1.3 and 1.3 of the second-direction padding data 921 according to the data addresses s4, s4, s5, s6, s7 and s7, and may obtain third-row data 2.0, 2.0, 2.1, 2.2, 2.3 and 2.3 according to the data addresses s8, s8, s9, s10, s11 and s11, thereby obtaining the complete three rows of second-direction padding data 921. In some embodiments, the second padding controller 141 transmits related information Si of the data processing above to the rewriter 143, so as to implement communications between the second padding controller 141 and the data rewriter 143. It is understandable that, if only one column of data needs to be padded in the second direction (for example, the horizontal direction), only one repeated data address, for example, s0, s0, s1, s2 and s3, or s0, s1, s2, s3 and s3, needs to be provided in the second padding control signal Sp2.

In some embodiments, the data rewriter 143 performs data rewriting on the first-direction padding data read from the internal memory 120 and used as padding data in the second direction, so that rewritten padding data and the adjacent first-direction padding data form a mirror symmetry. In some embodiments, since the second padding controller 141 reads the first-direction padding data according to the at least one repeated data address of the internal memory 120 to achieve data padding in the second direction, the rewriter 143 of the present application may perform data cropping and rearrangement on the second-direction padding data read by the second padding controller 141 from the internal memory 120; in other words, the data rewriter 143 adaptively performs data rewriting on data padding.

Figure 9:
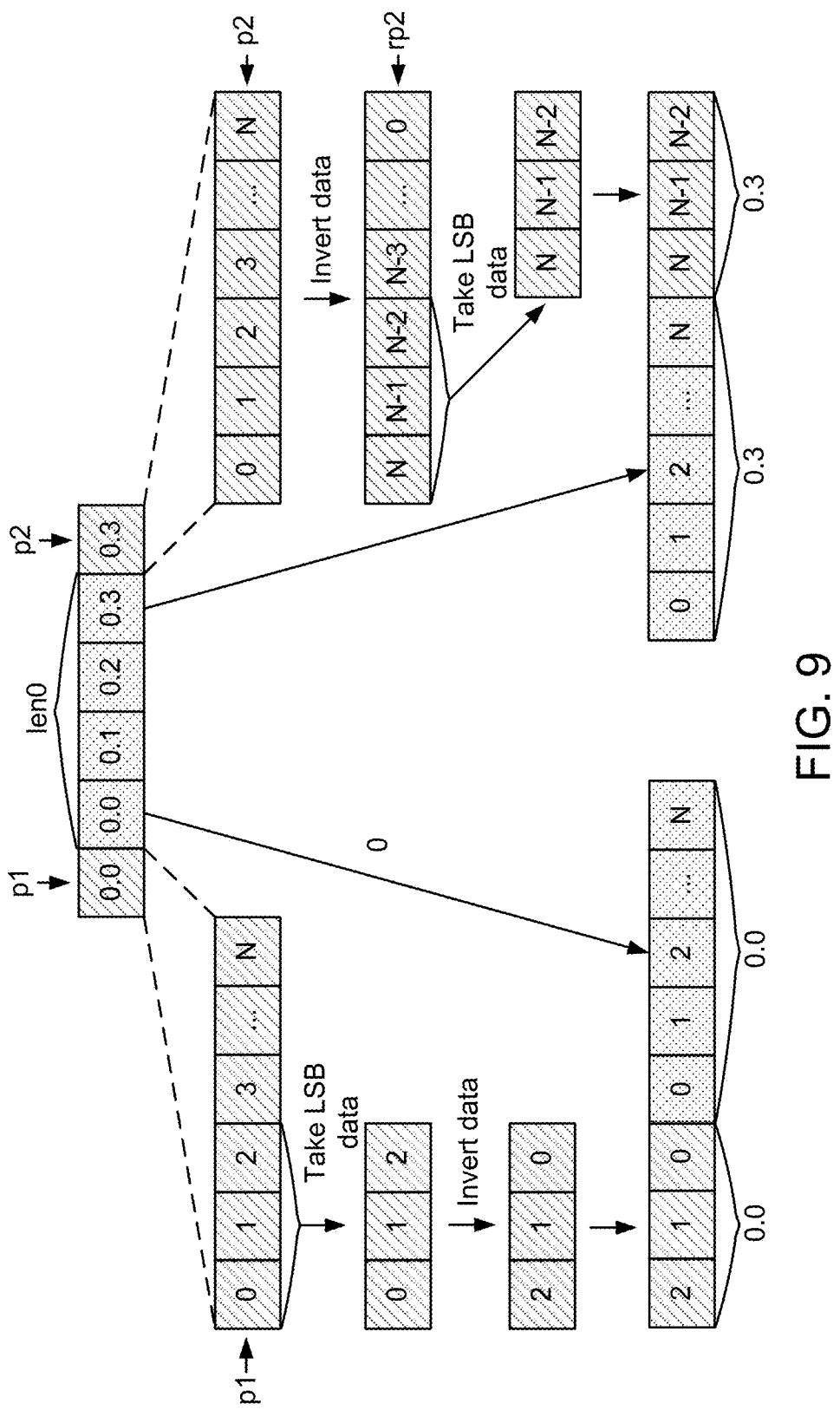
FIG. 9 is a schematic diagram of row data of second-direction padding data and an operation thereof according to some embodiments of the present application.

Details of data rewriting are described in combination with FIG. 9 below. FIG. 9 shows a schematic diagram row data of second-direction padding data and details of rewriting thereof according to some embodiments of the present application. The data rewriter 143 obtains a plurality of sets of first least significant bits (LSB) valid data 0, 1 and 2 in the data 0 to N of first padding data p1 (for example, the padding data 0.0), inverts the first LSB valid data 0, 1 and 2 to obtain a plurality of sets of inverted first LSB valid data 2, 1 and 0, and pads the inverted first LSB valid data 2, 1 and 0 to the location of the first padding data p1 (for example, the data 0.0) of the second-direction padding data. It is seen from FIG. 9 that, the padding data p1 (for example, the padding data 0.0) and the data 0.0 are in mirror symmetry.

Next, the data rewriter 143 obtains data 0 to N of second padding data p2 (for example, the padding data 0.3), inverts the second padding data p2 to obtain inverted second padding data rp2, obtains a plurality of sets of second LSB valid data N, N−1 and N−2 in the data N to 0 of the inverted second padding data rp2 (for example, inverted data 0.3), and pads the second LSB valid data N, N−1 and N−2 to the location of the second padding data p2 (for example, the padding data 0.3) of the second-direction padding data. It is seen from FIG. 9 that, the data 0.3 and the second padding data p2 (for example, the data 0.3) are in mirror symmetry.

The description above describes the details of how the data rewriter 143 rewrite the first-row data of the second-direction padding data 921 in FIG. 7. After the data rewriter 143 repeats the operations above to rewrite second-row data and third-row data of the second-direction padding data 921, rewritten second-direction padding data Srd in FIG. 1 may be obtained, and the rewritten second-direction padding data Srd is then stored to the data buffer device 800. The processing device 700 may obtain the rewritten second-direction padding data Srd from the data buffer device 800.

Figure 10:
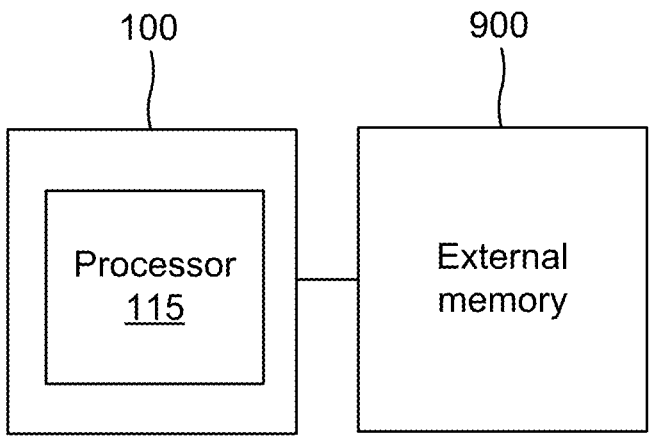
FIG. 10 is a schematic diagram of a data padding device and an external memory according to some embodiments of the present application.

FIG. 10 shows a schematic diagram of the data padding device 100 and the external memory 900 according to some embodiments of the present application. As shown in the drawings, the present application may execute a plurality of instructions by the processor 115 to implement the data padding method 200 in FIG. 2. For example, the present application may perform related control operations by means of executing the plurality of instructions in the external memory 900 by the processor 115, so as to control the various devices/elements in FIG. 1 to perform the data padding method 200 in FIG. 2.

It should be noted that, the present application is not limited to the embodiments shown in FIG. 1 to FIG. 10, and these embodiments are merely examples of implementations of the present application. To better understand the technical contents of the present application, the scope of protection of the present application is to be accorded with the broadest interpretation of the appended claims. Without departing from the spirit of the present application, all modifications and variations made to the embodiments of the present application by a person skilled in the art are to be encompassed within the scope of protection of the present application.

In conclusion, the data padding device 100 and the data padding method 200 of the present application are capable of performing data padding in multiple directions according to a padding control signal, and performing data padding while reading the data. Thus, the present application can enhance data processing speed, maximize the use of image data and prevent any waste in hardware resources.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded with the broadest interpretation so as to encompass all such modifications.

What is claimed is:

1. A data padding device, comprising:
   an internal memory;
   a direct access memory (DMA) circuit, performing, according to a first padding control signal, data padding in a first direction on raw data during a process of reading the raw data from an external memory to generate first-direction padding data, and storing the first-direction padding data to the internal memory, wherein the first-direction padding data comprises the raw data and first padding data originated from the raw data;

a data processing circuit, performing, according to a second padding control signal, data padding in a second direction on the first-direction padding data during a process of reading the first-direction padding data from the internal memory to generate second-direction padding data, wherein the second-direction padding data comprises the first-direction padding data and second padding data originated from the first-direction padding data; and a padding controller, generating the first padding control signal according to an enable signal, wherein the first padding control signal comprises a starting address and a data length;

wherein the DMA circuit reads the raw data from the starting address of the external memory, and continues reading in a first reading direction for the data length to obtain first data of the raw data, and the first padding data comprises the first data.

2. The data padding device according to claim 1, wherein the first padding control signal further comprises a stride, and the DMA circuit, after obtaining the first data, skips by the data length, the stride and the data length in a second reading direction opposite to the first reading direction to a target address, and continues reading from the target address for the data length in the first reading direction to obtain second data in the raw data, wherein the first padding data further comprises the second data.

3. The data padding device according to claim 1, wherein the data processing circuit comprises:

a padding controller, generating the second padding control signal according to an enable signal, the second padding control signal comprising a plurality of data addresses, the data addresses comprising at least one repeated data address, the padding controller further reading the first-direction padding data from the internal memory according to the data addresses to generate the second-direction padding data, wherein the first-direction padding data read from the internal memory according to the at least one repeated data address is the second padding data.

4. The data padding device according to claim 1, wherein the data processing circuit further comprises:

a data rewriter, performing data rewriting on the second padding data in a mirror symmetry manner.

5. The data padding device according to claim 4, wherein the data rewriter obtains a plurality of sets of first least significant bits (LSB) valid data of the first padding data used as the second padding data, inverts the first LSB valid data to obtain a plurality of sets of inverted first LSB valid data, and pads the inverted first LSB valid data to a location of the second-direction padding data.

6. The data padding device according to claim 4, wherein the data rewriter inverts the first padding data used as the second padding data to obtain inverted second padding data, obtains a plurality of sets of second LSB valid data of the inverted second padding data, and pads the second LSB valid data to the location of the second-direction padding data.

7. A data padding method, adapted for a data padding device comprising an internal memory, a direct memory access (DMA) circuit and a data processing circuit, the data padding method implemented by a processor executing a plurality of instructions, the data padding method comprising:

controlling the DMA circuit to perform, according to a first padding control signal, data padding in a first direction on raw data during a process of reading the raw data from an external memory to generate first-direction padding data, and to store the first-direction padding data to the internal memory, wherein the first-direction padding data comprises the raw data and first padding data originated from the raw data; and controlling the data processing circuit to perform, according to a second padding control signal, data padding in a second direction on the first-direction padding data during a process of reading the first-direction padding data from an internal memory to generate second-direction padding data, wherein the second-direction padding data comprises the first-direction padding data and second padding data originated from the first-direction padding data, wherein the data padding device further comprises a padding controller, and the controlling of the DMA circuit to perform, according to the first padding control signal, data padding in the first direction on the raw data during the process of reading the raw data from the external memory to generate the first-direction padding data comprises:

controlling the padding controller to generate the first padding control signal according to an enable signal, wherein the first padding control signal at least comprises a starting address and a data length; and controlling the DMA circuit to read the raw data from the starting address of the external memory, and to continue reading for the data length to obtain first data of the raw data, wherein the first padding data comprises the first data.

8. The data padding method according to claim 7, wherein the first padding control signal further comprises a stride, and wherein the data padding method, after controlling the DMA circuit by the processor to obtain the first data, further comprises controlling the DMA circuit to skip by the data length, the stride and the data length in a second reading direction opposite to the first reading direction to a target address, and to continue reading from the target address for the data length in the first reading direction to obtain second data in the raw data, wherein the first padding data further comprises the second data.

* * * * *